United States Patent [19]

Blount et al.

[11] 3,913,678
[45] Oct. 21, 1975

[54] METHOD AND COMPOSITION FOR TREATING A WELL TO PREVENT THE FORMATION OF SULFUR AND SCALE DEPOSITIONS

[75] Inventors: Floyd E. Blount, Dallas, Tex.; Reinhard F. Becker, Hamburg, Germany; Siegfried Lechler; Helmut Ockelmann, both of Celle, Germany

[73] Assignee: Mobil Oil Corporation, New York, N.Y.

[22] Filed: Apr. 5, 1974

[21] Appl. No.: 458,143

[52] U.S. Cl. .............................. 166/310; 166/244 C
[51] Int. Cl.² ......................................... E21B 43/00
[58] Field of Search ............ 137/15; 166/244 C, 279, 166/304, 310; 175/64; 252/8.3, 8.55 B

[56] References Cited
UNITED STATES PATENTS

| | | | |
|---|---|---|---|
| 2,429,593 | 10/1947 | Case | 166/310 |
| 2,777,818 | 1/1957 | Gambill | 252/8.55 B |
| 2,939,842 | 6/1960 | Thompson | 252/8.3 |
| 3,170,815 | 2/1965 | White | 252/8.55 B |
| 3,367,416 | 2/1968 | Ralston et al. | 166/310 |
| 3,528,502 | 9/1970 | Oleen | 166/279 |
| 3,597,352 | 8/1971 | Stanford | 252/8.55 B |
| 3,656,551 | 4/1972 | Biles | 166/310 |
| 3,660,287 | 5/1972 | Quattrini | 166/310 |
| 3,688,829 | 9/1972 | Jones | 166/304 |
| 3,728,419 | 4/1973 | Stanford et al. | 252/8.55 B |

FOREIGN PATENTS OR APPLICATIONS

| | | | |
|---|---|---|---|
| 664,880 | 6/1963 | Canada | 166/244 C |

OTHER PUBLICATIONS

Jones et al., "New Inhibitor Safeguards Vapor Spaces Against H$_2$S Corrosion," O & G Journal, 9/24/56, pp. 132–137.

*Primary Examiner*—Ernest R. Purser
*Assistant Examiner*—Jack E. Ebel
*Attorney, Agent, or Firm*—C. A. Huggett; Henry L. Ehrlich

[57] ABSTRACT

This specification discloses a composition and method for treating a well that is used for producing sour gas having dissolved sulfur, and water containing scale-forming ions from a subterranean formation to remove and prevent the deposition of sulfur and scale in the well. The composition is comprised of a mixture of a chemical that is capable of forming a polysulfide with hydrogen sulfide and sulfur and a complexing agent which is capable of complexing the scale-forming ions in the water. The composition is circulated into and from the well and sulfur and scale are removed therefrom.

6 Claims, No Drawings

METHOD AND COMPOSITION FOR TREATING A WELL TO PREVENT THE FORMATION OF SULFUR AND SCALE DEPOSITIONS

BACKGROUND OF THE INVENTION

This invention is directed to a method and composition for treating a well which communicates with a sour gas reservoir.

Elemental sulfur is soluble in sour (hydrogen sulfide containing) gas and the solubility increases with increasing temperature, pressure, and hydrogen sulfide content. The solubility also increases with increasing carbon dioxide content. Carbon dioxide may be present in the sour gas and hydrogen sulfide is present in varying amounts. In the production of sour gas reservoirs containing dissolved sulfur, problems have been encountered due to the deposition of sulfur downhole. As the gas flows from the reservoir up the well the temperature and pressure of the gas decrease and the solubility of the sulfur in the gas decreases, thus resulting in the deposition of sulfur in the well. Production tubing is commonly used in the gas wells and the sulfur is thus deposited on the tubing walls, thereby decreasing or blocking the flow path of the gas through the tubing. The problem resulting from the sulfur deposition is most severe when the gas that is produced is dry gas, that is, when liquid hydrocarbons are not produced along with the gas. Liquid hydrocarbons or other liquids which might be produced with the gas may dissolve and also may transport in undissolved form the elemental sulfur and thus lessen or prevent the problem of tubing plugging by deposited sulfur.

The downhole sulfur deposition problem and a process for combatting the problem are discussed in an article entitled "Sulfur Plugging Whipped in Gas Wells," The Oil and Gas Journal, The Petroleum Publishing Co., 211 S. Cheyenne, Tulsa, Oklahoma 74101, Apr. 17, 1967, p. 113. The process there described for combatting the problem of sulfur deposition in production tubing involves dissolving in a high-boiling paraffin-base mineral oil the precipitated sulfur before the sulfur accumulation reaches harmful proportions. The mineral oil is injected downhole and into the production tubing below the point where precipitation first occurs and is flowed up the production tubing to the surface to remove the sulfur from the production tubing. The oil may be reused after treating at the surface to remove the sulfur therefrom.

In U.S. Pat. No. 3,488,092 there is described another process for treating a gas well which produces hydrogen sulfide in which sulfur tends to plug the piping therein. A medium or solvent is circulated through the well to remove the sulfur and transport it to the surface. The medium or solvent may be an aromatic selected from benzene, toluene, thiobenzene, diphenyl and their halogen substituted derivatives, or may be an aqueous alkali metal sulfide or bisulfide admixed with some alkali metal hydroxide. In U.S. Pat. No. 3,531,160 there is described a process for treating a sour gas-sulfur well to remove elemental sulfur therefrom. There is circulated into and from the well a liquid alkyl sulfide and/or a liquid alkyl disulfide. N-butyl sulfide, di-tert-butyl disulfide, and polysulfides are solvents useful in sour gas-sulfur production to remove sulfur which otherwise may cause plugging problems.

An article entitled "New Sulphur Plugging Prevention Developed for Sour Gas Wells," Oilweek, published by Maclean-Hunter, Ltd., 805 8th Ave. S.W., Calgary, Alberta, Canada, Sept. 2, 1968, p. 21, discusses the problem and solutions for downhole sulfur deposition from sour gas. Two possible ways are enumerated for realizing the objective of preventing the depositing of sulfur from the very beginning by dissolution in a suitable medium and bringing this medium with the gas stream to the surface; namely (1) a physical dissolution of the sulfur carried along by the gas, and (2) a direct chemical bond, e.g. by the formation of water-soluble polysulfides. With regard to the physical dissolution, it is noted that hydrocarbons and carbon disulfide have been considered. Carbon disulfide has been used for the removal of sulfur deposited in riser pipes. However, because of its high degree of toxicity, a permanent use of carbon disulfide is considered to be undesirable. For the chemical bond of the sulfur, the formation of water-soluble compounds was considered since natural gas is normally saturated with water vapor under the conditions prevailing in the formation and water condenses out upon cooling down on its way to the wellhead. It is pointed out that elemental sulfur can be dissolved by aqueous alkali solutions in the presence of hydrogen sulfide with the formation of alkali polysulfides. In the same way, organic bases, e.g. alkyl-amines which are miscible with water, form polysulfides when hydrogen sulfide and elemental sulfur are offered simultaneously. Of the great number of alkylamines available, ethylamine was considered to be of special interest since its polysulfide solutions can be easily decomposed as analog solutions of ammonium polysulfides. The particular process which was described for dissolving sulfur from production strings involved injecting aqueous ethylamine solutions into the production string to dissolve the sulfur therefrom. The polysulfide solution is decomposed at the surface by separation in a still at approximtely 140° C. The distillate which in addition to ethylamine and water contains hydrogen sulfide and carbon dioxide is recycled to the well.

Another problem which commonly occurs in the production of fluids from subterranean formations is the plugging of the production tubing by scale formed from brines which contain scale-forming ions such as calcium and magnesium ions. Various techniques have been used to remove these scales. These techniques include both mechanical and chemical means. In U.S. Pat. No. 3,688,829 there is described a process for removing calcium scale from oil wells which involves introducting into the well and in contact with the scale an aqueous solution of sodium or potassium gluconate and sodium or potassium hydroxide. In this patent reference is made to U.S. Pat. No. 2,396,938 where there is described a technique for removing boiler scale by the use of theylenediaminetetraacetic acid (EDTA). It is noted, however, that since EDTA is an expensive chemical, its use has been rather limited for treating wells. In oil wells the chemicals that are usually used are much less expensive, such as, for example, hydroxy acetic acid (glycolic acid) and sodium hydroxide. In U.S. Pat. No. 3,402,770 to Messenger there is described a multicomponent single-phase solution which has many uses in cleaning out wells and surrounding subterranean formations. The solution contains as its essential elements an organic solvent for oil and asphalt and a liquid having mutual solubility for oil and water. Other components such as acid, or surfactant, may be added and the solution will still remain a single-phase solution. The solution is mainly useful as a solvent to remove a wide variety of flow-restricting materials such as damaging water, mud filtrate, emulsions, wax, asphalt, and scale. Any of the known organic solvents for oil and asphalt may be employed such as, for example, carbon disulfide, benzene, toluene, and xylene. The liquid having mutual solubility for oil and water is defined as an organic liquid containing both a hydrocarbon group and a polar group. The acids which are mentioned for inclusion in the solution include hydrochloric acid, hydrofluoric acid, sulfonic acid, acetic acid, formic acid, and ethylenediaminetetraacetic acid.

SUMMARY OF THE INVENTION

This invention is directed to a method of producing gas containing hydrogen sulfide and dissolved sulfur, and water containing scale-forming ions from a subterranean formation penetrated by a well. The method is comprised of circulating into and from the well a mixture of a chemical that is capable of forming a polysulfide with hydrogen sulfide and sulfur and a chemical that is capable of forming a chemical complex with the ions in the water to mitigate the formation of sulfur and scale in the well. Ethylamine is a preferred chemical that is capable of forming a polysulfide with hydrogen sulfide and sulfur. Ethylenediaminetetraacetic acid and salts thereof are preferred chemicals for forming a chemical complex with the scale-forming ions in the water.

In accordance with another embodiment of this invention there is provided a composition for treating a well to remove sulfur and scale therefrom. The composition is comprised of a mixture of a chemical that is capable of forming a polysulfide with hydrogen sulfide and sulfur and a chemical that is capable of forming a chemical complex with the scale.

DESCRIPTION OF THE PREFERRED EMBODIMENTS

This invention is directed to a method of producing from a subterranean formation a sour gas that contains dissolved sulfur, and water that contains scale-forming ions. More particularly, this invention is directed to treating a well to remove and prevent the deposition therein of sulfur and scale.

Subterranean reservoirs exist which contain sour (hydrogen sulfide containing) gas having elemental sulfur dissolved therein. The gas composition, in addition to hydrogen sulfide and dissolved elemental sulfur, may also be comprised of such other gases as methane, carbon dioxide, and nitrogen. The reservoir may also contain formation water such as a brine that contains calcium and magnesium chlorides. The brine thus contains scale-forming ions such as for example the calcium and magnesium ions. The environment which exists in the reservoir in an acidic environment brought about by the presence of the hydrogen sulfide and carbon dioxide along with the water. In the production of sour gas from such a reservoir a well is provided which extends from the surface of the earth and communicates with the reservoir. The well may be completed using conventional completion techniques to include, for example, a production tubing which extends to a lower portion of the well for the production of the sour gas to the surface and a flow path by which a fluid may be injected down the well and into the production tubing at a lower portion of the well. The flow path may be provided, for example, by installing a second string of tubing which extends to the lower portion of the well and communicates there with the production tubing by means of a crossover valve.

In the production of the sour gas from the reservoir the temperature and pressure of the gas decrease as the gas flows up the production tubing toward the surface and consequently the solubility of the sulfur in the gas decreases. This results in the deposition of elemental sulfur on the walls of the production tubing. Concomitantly with the production of gas there is produced from the reservoir and up the production tubing water that contains scale-forming ions such as calcium and magnesium ions. Under the acidic environment which exists in the reservoir and production tubing the water may be produced without any significant deposition of scale in the production tubing. The water as it flows through the tubing may transport a portion of the deposited sulfur to the surface of the earth and thus may facilitate the production of sulfur from the well. However, many reservoirs contain such substantial amounts of sulfur dissolved in the gas that sulfur is deposited in the production tubing at a rate such that the brine flowing up the production tubing does not have the capacity to remove and transport all of the sulfur from the tubing.

As previously indicated, there are numerous techniques which may be employed to remove the sulfur from the production tubing. These techniques include circulating down the well and up the production tubing solvents including aromatic hydrocarbons and carbon disulfide for solubilizing the sulfur and transporting it to the surface. Those solvents which are compatible with the brine and the reservoir may be used without incurring problems due to the deposition of scale in the production tubing. However, the choice of a solvent is limited by such factors as its availability and cost and its other characteristics. For example, carbon disulfide is a very good sulfur solvent but is toxic and therefore its use is inherent with danger to personnel.

One of the techniques for removing deposited sulfur from production tubing involves circulating down the well and up the production tubing a chemical that is capable of forming a polysulfide with hydrogen sulfide and sulfur in the well. The formed polysulfide is a sulfur solvent and will dissolve the sulfur in the production tubing. Examples of chemicals which may be used for forming the polysulfide are any water-soluble amine that is capable of forming a polysulfide, ammonium hydroxide, and any water-soluble metal hydroxide such as sodium hydroxide. Of the water-soluble amines that are capable of forming a polysulfide, ethylamine is particularly desirable because of its availability and cost. However, the use of chemicals that are capable of forming a polysulfide with hydrogen sulfide and sulfur in the well reduces the acidic environment of the well and this causes the precipitation of scale from the brine in the production tubing. Thus, the injection of chemicals downhole for forming a polysulfide to dissolve and remove sulfur therefrom is very effective for removing sulfur but where brines having scaleforming ions are present results in a different problem, namely that of deposition of scale in the production tubing.

We have discovered a composition and a technique for treating a well used in the production fo sour gas that contains dissolved elemental sulfur therein and water that contains scale-forming ions to overcome the problem of sulfur and scale deposition in the well. The composition is comprised of a mixture of a chemical that is capable of forming a polysulfide with hydrogen sulfide and sulfur and a complexing agent which is capable of complexing the scale-forming ions in the brine. The chemical which is capable of forming a polysulfide with hydrogen sulfide and sulfur in the well is present in the composition in an amount of from about 99 to 50 weight percent of the cmposition and the material that is capable of forming a chemical complex with ions in the brine is present in the composition in an amount of from 1 to 50 weight percent of the composition. Desirably the amount of the complexing chemical in the composition should be about 5 percent greater than the chemical equivalent concentration of the scale-forming chemicals in the water. Ethylamine is a preferred chemical for forming a polysulfide with hydrogen sulfide and sulfur. Ethylamine is readily available at a reasonable cost and after use in the well may be easily reclaimed by a supplemental process and thereafter reused. Other chemicals that are capable of forming a polysulfide with hydrogen and sulfur and which may be employed include any water-soluble amine that is capable of forming a polysulfide, ammonium hydroxide, and any water-soluble metal hydroxide such as sodium hydroxide. A preferred chemical that is capable of forming a chemical complex with the scale-forming ions in the water is ethylenediaminetetraacetic acid (EDTA) and salts thereof, and in particular the disodium and tetrasodium salts thereof. Disodium EDTA and tetrasodium EDTA are particularly preferred chemicals for forming a chemical complex with the ions in the water because there chemicals do not interfere with the regeneration of the ethylamine and because the chemicals can be recovered for reuse in accordance with a process described in U.S. Pat. No. 3,321,521 to George T. Kerr. Another chemical which may be used for forming a chemical complex with the scale-forming ions is nitrile triacetic acid and salts thereof.

An embodiment of this invention is directed to a method of treating a well that is used in the production of sour gas that contains dissolved sulfur therein and water that contains scale-forming ions from a subterranean formation. In accordance with this embodiment there is circulated into and from the well the above described composition that is comprised of a mixture of a chemical that is capable of forming a polysulfide with hydrogen sulfide and sulfur and a chemical that is capable of forming a chemical complex with the scale-forming ions in the water to mitigate the problem of sulfur and scale deposition in the well. A sufficient amount of the composition is circulated into and from the well to mitigate the formation of sulfur and scale in the well and to maintain the flow path of the well open to fluids produced from the reservoir. The optimum concentrations of the chemical that is capable of forming a polysulfide with hydrogen sulfide and sulfur and the chemical that is capable of forming a chemical complex with the ions in the water depend upon the amount of dissolved sulfur and the amount of scale forming ions that are present in the flow stream.

The fluids that are produced from the well may be passed through a separator where they are separated into a gas stream and a liquid stream. The gas is then flowed to its destination and the liquid is further processed to recover the composition used for treating the well. For example when the composition used for treating the well is comprised of ethylamine and $Na_4EDTA$, the liquid stream is comprised of ethylamine (polysulfide), brine, and $Na_4EDTA$. The liquid stream is then passed through an ethylamine regeneration unit to recover the ethylamine and the liquid stream is further treated in accordance with the process described in U.S. Pat. No. 3,321,521 to recover the EDTA and separate a sulfur slurry from the liquid stream. The ethylamine and EDTA are then recombined for reuse in treating the well. Sulfur may be recovered by known techniques from the sulfur slurry.

We claim:

1. A method of producing a sour gas and water having scale-forming ions from a subterranean formation penetrated by a well having tubing therein, said sour gas containing in said formation under reservoir conditions of temperature and pressure sulfur dissolved therein in an amount sufficient to result in the deposition of elemental sulfur in said well as the temperature and pressure of said sour gas decrease during flow of said gas up said well, comprising:
   a. producing said sour gas and said water from said formation via said tubing, whereby an acidic environment is provided in said tubing and elemental sulfur is deposited in said tubing;
   b. circulating down said well and up said tubing a chemical that forms a polysulfide with hydrogen sulfide and sulfur to dissolve and remove said sulfur from said tubing; and
   c. circulating down said well and up said tubing said chemical also reducing the acidic environment in said tubing thereby causing precipitation of scale from the water being produced in said tubing another chemical that is capable of forming a chemical complex with said ions of said water to mitigate the precipitation of scale in said tubing.

2. The method of claim 1 wherein said chemical that is capable of forming a polysulfide with hydrogen sulfide and sulfur is ethylamine.

3. The method of claim 2 wherein said chemical that is capable of forming a chemical complex with said scale-forming ions in said water is selected from the group consisting of ethylenediaminetetraacetic acid and salts thereof.

4. The method of claim 3 wherein said chemical that is capable of forming a chemical complex with said scale-forming ions in said water is a sodium salt of ethylenediaminetetraacetic acid.

5. The method of claim 1 wherein said chemical which forms a polysulfide with hydrogen sulfide and sulfur and said another chemical that is capable of forming a chemical complex with said ions of said water are circulated as a mixture down said well and up said tubing.

6. The method of claim 5 wherein said mixture is comprised of ethylamine and a sodium salt of ethylenediaminetetraacetic acid.

* * * * *